Figure 1A:
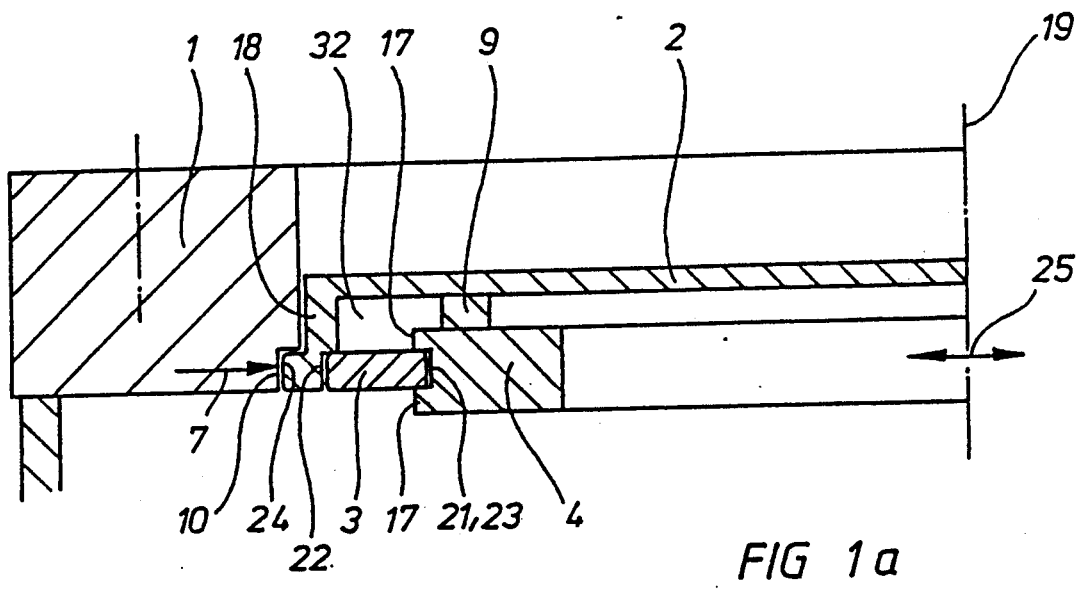

United States Patent [19]

Bösch

[11] Patent Number: 4,988,075
[45] Date of Patent: Jan. 29, 1991

[54] SEAL FOR VALVES OR FLANGES, IN PARTICULAR FOR VACUUM TECHNOLOGY

[76] Inventor: Hubert R. Bösch, Sandstrasse 29, 6890 Lustenau, Austria

[21] Appl. No.: 420,476

[22] Filed: Oct. 12, 1989

[30] Foreign Application Priority Data

Oct. 13, 1988 [DE] Fed. Rep. of Germany ....... 3834913

[51] Int. Cl.[5] .............................................. F16K 1/36
[52] U.S. Cl. .................................. 251/158; 251/334; 277/138; 277/176; 277/190
[58] Field of Search ...................... 251/334, 158, 186; 277/190, 170, 138

[56] References Cited

U.S. PATENT DOCUMENTS

| | | |
|---|---|---|
| 1,654,516 | 12/1927 | Wilson . |
| 1,965,273 | 7/1934 | Wilson . |
| 3,970,281 | 7/1976 | Heeb ................................ 251/158 X |
| 4,244,557 | 1/1981 | Leybold-Heraeus . |
| 4,318,532 | 3/1982 | Balzers . |
| 4,627,599 | 12/1986 | Schertler . |

FOREIGN PATENT DOCUMENTS

| | | |
|---|---|---|
| 458579 | 7/1961 | Fed. Rep. of Germany . |
| 7345743 | 7/1975 | Fed. Rep. of Germany . |
| 7523682 | 12/1975 | Fed. Rep. of Germany . |
| 7513453 | 6/1976 | Fed. Rep. of Germany . |
| 2947585 | 8/1981 | Fed. Rep. of Germany . |
| 3116401 | 11/1982 | Fed. Rep. of Germany . |
| 3224870 | 1/1984 | Fed. Rep. of Germany . |
| 1306407 | 12/1964 | France . |
| 600223 | 6/1978 | Switzerland . |
| 611687 | 6/1979 | Switzerland . |

Primary Examiner—Arnold Rosenthal
Attorney, Agent, or Firm—Stevens, Davis, Miller & Mosher

[57] ABSTRACT

For the sealing of valves or flanges, particularly used in vacuum technology, two opposed sealing surfaces are arranged at a main flange, on which a sealing element can be brought to rest, which is in the form of a cup spring and which is adjustable in the axial direction. In order to perform this operation with a smaller closing force, the cup spring is arranged in the space between the axially movable ring of a smaller diameter and a washer of greater diameter. The washer is radially outwardly and inwardly deformable, in an elastic manner, and the radial length of the cup spring is selected, so that when the seal is open, the cup spring is wedged within the space and when the seal is closed, it rests on the main flange in a nearly parallel position on a radius line with the seat of the seal.

6 Claims, 3 Drawing Sheets

SEAL FOR VALVES OR FLANGES, IN PARTICULAR FOR VACUUM TECHNOLOGY

The object of the present invention is a seal in accordance with the main concept of the appended claims.

For example, from U.S. Pat. No. 4,318,532 or German Pat. No. 3,116,401, the construction of a seal of the initially mentioned type is known, wherein at two opposite housing flanges, sloping sealing surfaces are present, against which a cup spring can be pressed, and where the counter pressure is applied via a pressing rod in the axial direction.

The disadvantage of this known seal arrangement is that a resolution of forces takes place at the seat of the seal, between the outer periphery of the cup spring and the sloping housing flange, wherein a power transmission angle of approximately 12° is always present.

One cannot fall short of this angle of approximately 12°, for if it is reduced to 8°, for example, the cup spring gets jammed at the seat of the seal and can no longer be opened.

Thus, an unfavorable resolution of forces at the seat of the seal is a disadvantage, where an axial force and a sealing force in the vertical direction is always produced.

Thus, the sealing force is determined by means of a resolution of forces at the mentioned triangle of forces and is produced by the axial force.

It is the object of the present invention to further develop a seal, of the initially described type, in such a way that forces as small as possible have to be exerted in the axial direction in order to produce a higher sealing force in the vertical direction.

For the solution of this object the invention is characterized in that the cup spring is arranged inside the space between an axially adjustable ring of a small diameter and a washer of greater diameter; in that the washer is radially deformable in an elastic manner in an outward and inward direction, and in that the radial length of the cup spring is such that when the seal is opened, the cup spring is tilted inside the space, and when the seal is closed it is approximately parallel to the radius line, wherein the seat of the seal rests against the main flange.

With the indicated technology, a substantial advantage is achieved in that only a single sealing surface is present, while in German Pat. No. OLS 2,947,585 two different sealing surfaces were present.

Through the use of a washer, in accordance with the present invention, an inner seal seat is no longer required, as is shown in the German Pat. Publication; hence, merely a single seal seat is present on the outer periphery of the washer.

An additional considerable advantage is the superior resolution of forces of the present invention, as compared with the resolution of forces according to German Pat. No. OLS 2,947,585.

There, an axially movable ring is also shown which has, however, a conical sealing surface, which together with a tilted cup spring, is to result in sealing surfaces which are approximately vertical to each other.

At these sealing surfaces, which glide along in a tilted position, the previously described unfavorable resolution of forces is produced, which is connected to the disadvantage of a relatively strongly limited sealing pressure and a rolling-off of the cup spring at the two seal seats, which also leads to premature wear and tear.

In accordance with the present invention, a tilted movement of the cup spring in the axial direction is carried out, where it is essential that cup spring (3) rest against opposed cylindrical surfaces, which are aligned while in the closed position, so that in this way a type of snap effect to the cup spring is achieved.

According to a preferred arrangement of the present invention, it is preferable in a flange connection that in the case of two flanges which can be axially moved in relation to each other, a washer serving as a sealing element be present in the space between the flanges, which bridges the separation gap of the flanges where the outer periphery of the washer rests against the separation gap and the tiltable cup spring rests against the inner periphery of the washer where the inner periphery of the cup spring is supported by the outer periphery of an axially movable ring.

Thus, the seal of the valve or of the flange operates essentially in the same manner.

The object of the present invention results not only from the object of the individual patent claims, but also from a combination of the individual patent claims. All details and characteristics revealed in the documents, including the summary, and in particular, the spatial arrangement shown in the drawings, are important to the invention, inasmuch as they are new to the state of the technology, either individually or in combination.

Figure 1B:
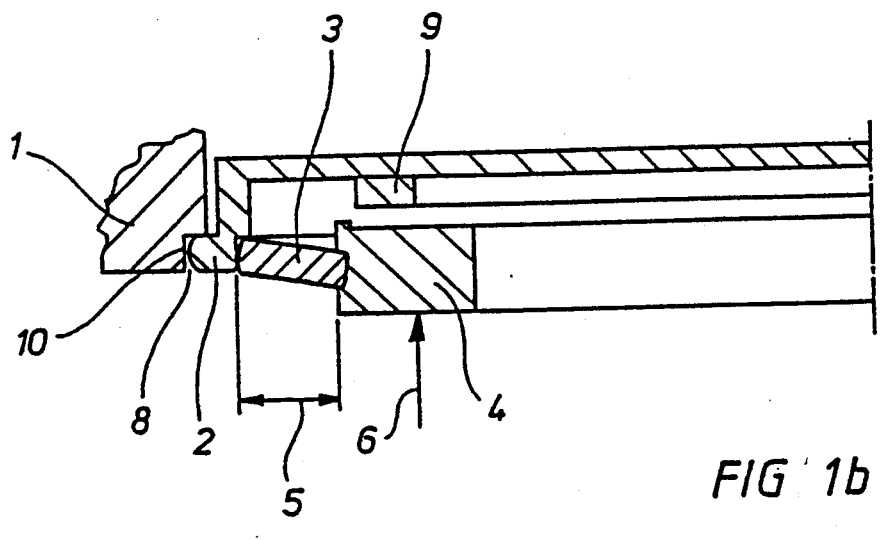
Figure 2:
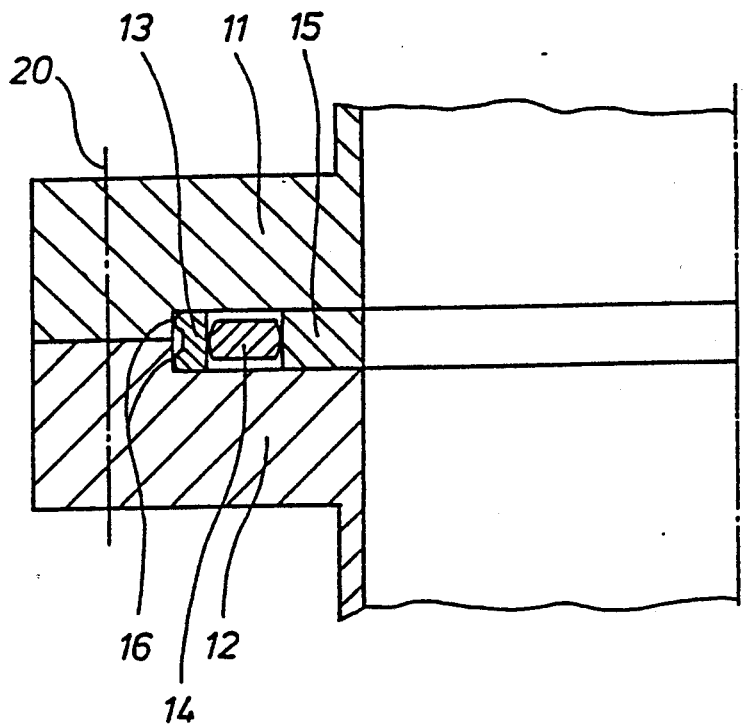
Figure 3:
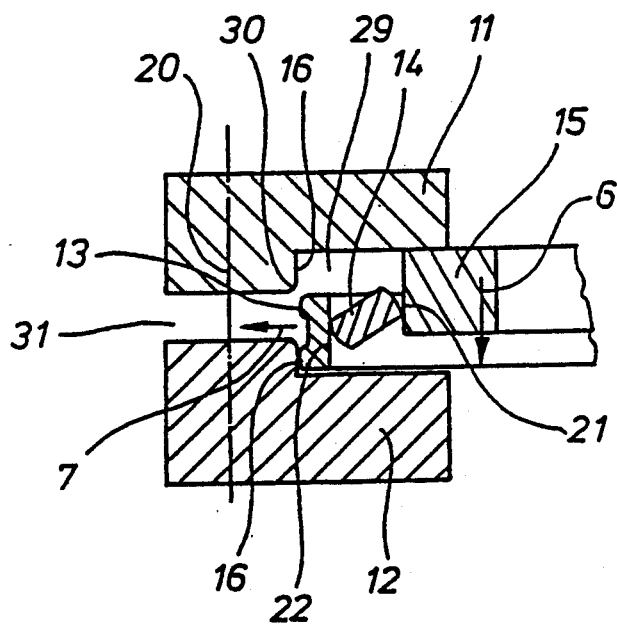
Figure 4:
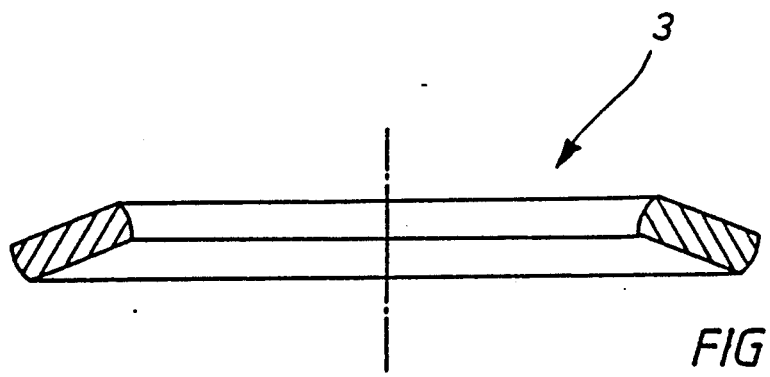
Figure 5:
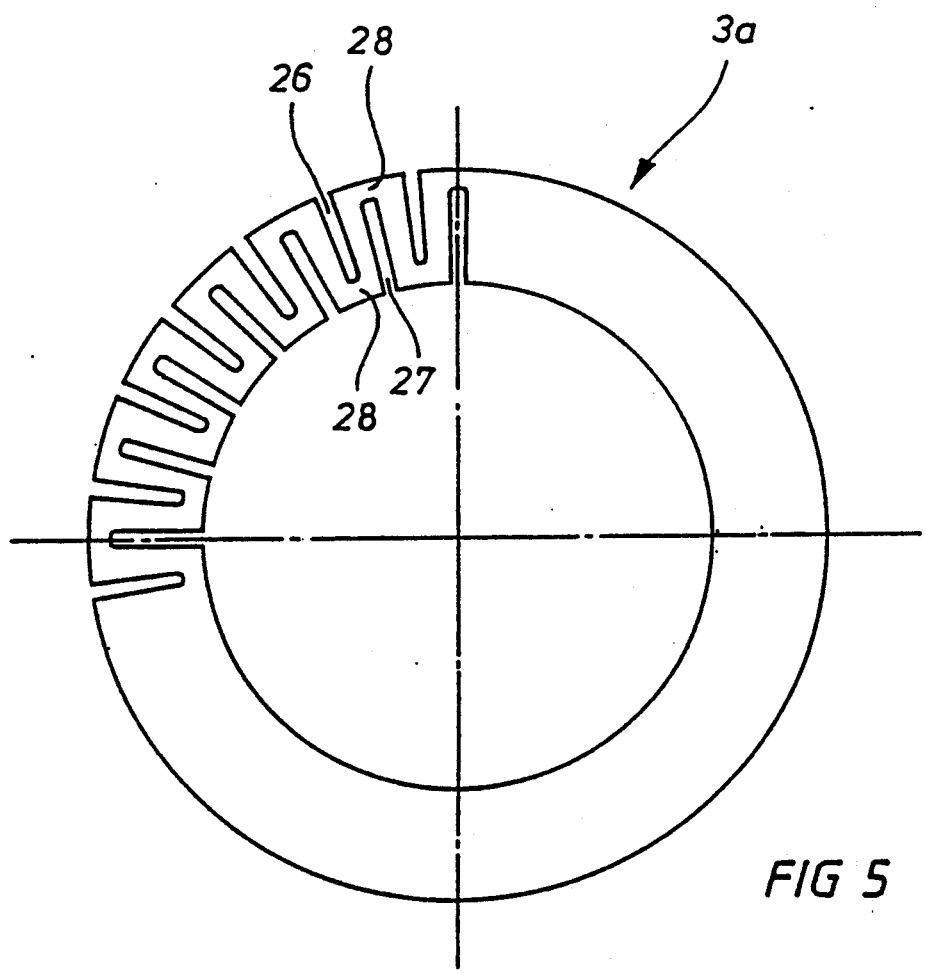

In the following text the invention is further explained by means of drawings which represent several arrangements of the invention. Here, further characteristics and advantages of the invention are revealed in the drawings and their description. It is shown in:

FIG. 1a: a diagram of a valve seal, in accordance with the invention, in the closed state;

FIG. 1b: the valve seal in the open state;

FIG. 2: a flange seal, in accordance with the invention, in the closed state;

FIG. 3: the flange seal, according to FIG. 2, in the open state;

FIG. 4: a cross section of a cup spring in a primary arrangement;

FIG. 5: the secondary arrangement of a cup spring, as viewed from above.

FIG. 1a shows a valve seal with main flange (1) which has seal seat (10) arranged at an interior recess of the housing.

In the closed position, the bulging outer periphery of seal edge (24) rests against this seal seat, which is formed at flange (18) of metal washer (2).

In a radially inward direction toward washer (2), ring (4) is provided, which together with washer (2) is arranged on central axis (19), where ring (4) has a certain radial play (25) on central axis (19) opposite to the one drawn in direction of the arrow.

In space (32) between the inner periphery of flange (18) and the outer periphery of ring (4), cup spring (3) is arranged, which as a force element, is to transfer the closing force exerted on ring (4) in the axial direction (direction of arrow (6)) into the one which is opposite to the one drawn in the direction of arrow (7) and onto seal seat (10).

Between washer (2) and main flange (1), a small crack exists (approximately 0.05 mm). Cup spring (3) is either very flexible by virtue of its material, or it contains a multitude of slits (from the inside toward the outside and vice-versa) so that it is extremely flexible. On ring (4), a force (arrow 6) is exerted. At first, flange (18) of washer (2) is pressed outward until the latter rests against the main flange. If ring (4) is pressed further in the direction of arrow (6), it applies the sealing force to main flange (1) via cup spring (3) and washer (2). During this process, its diameter is slightly pressed toward the inside. Also, cup spring (3) and washer (2) are compressed and flange (1) slightly shifts toward the outside. The transitions between the individual engaged surfaces are also deformed somewhat (elastically) (Hertzian stress). From a mathematical point of view, the whole is arranged in such a way that in the locked state (FIG. 1a), the forces in the direction of the arrow are 7=0 (i.e., in the vertical direction in relation to the sealing force) and that ring (4) exerts enough force to produce the described deformations as well as the sealing force. Thus, the sealing forces extend radially toward the inside (evenly distributed) and thus, mutually cancel each other out at the periphery.

The above described deformations are extremely small. For this reason the angle of cup spring (3) may be kept very shallow (approximately 10°). In the initial area of the deformation, when the sealing lip is not yet in the resting position, the force transmission is not too good (approximately 1:6 to 1:10)--force in the vertical direction (6) in comparison to the sealing direction of arrow (7).

At first only the crack (8) has to be bridged. Once this gap (8) is overcome, force (7) increases greatly. Simultaneously, the transmission of the force increases equally. At that point it already amounts to 1:15 or better. The higher sealing force (7) becomes, the closer the cup spring is to dead center. At the end (closed position), while the greatest force is exerted in the direction of arrow (7), its conversion ratio is theoretically 1:infinite. At that point, merely the cross section of ring (4) and its material determine the force. In order to prevent tripping in the direction of arrow (6), stop (9) is rigidly or releasably provided on washer (2).

Thus, the cup spring is wedged with the axial movement of ring (4) in the direction of arrow (6) between two opposing cylindrical contact surfaces (21, 22), and reproduces the force exerted on it, which extends radially in the upward direction and is exactly the same, namely in the direction of the seal seat (direction of arrow 7) toward radially upwardly bendable flange (18) of washer (2), which thereby is pressed in a radially outward manner in the direction opposite to that of arrow (7) and rests with its seal edge (24) against seal seat (10) at main flange (1), which is rigidly connected to the housing, while exerting a high sealing force.

With the present invention, a much smaller closing force in the axial direction is required than with the arrangements presented up to now, because a direct transmission of force is always obtained in the direction opposite to that of arrow (7) (without the introduction of (additional) angular forces).

Thus, it is essential that washer (2) be used with radially upwardly deformable flange (18), which at its outer periphery is provided with seal edge (24).

Through the use of a washer with a radially upwardly deformable sealing flange (18), one obtains the advantage that only a single seal seat must be provided, while in other seals, according to the present state of technology, usually two seal seats are provided.

Seal edge (24) of flange (18) may be constructed in many ways. Its profile may be bulky, i.e., it may have a certain radius; however, it may also have a trapezoidal profile, in the form of an edge.

Furthermore, it is essential that inner support surface (21) of cup spring (3) be provided in the area of annular groove (23), which is limited axially toward the top and toward the bottom by appropriate projections (17). In this way, an unwanted slippage of cup spring (3) occurs during its tilted movement (compare the transition of the FIG. 1a to FIG. 1b).

Furthermore, it is important that washer (4) rest on central axis (19) with a certain radial play (25), in order to be able to accept these deformations which are produced by the wedging of cup spring (3) in the sealed state.

Thus, it is essential with the present invention that with considerably lower closing forces in the direction of arrow (6), higher sealing forces in the direction of arrow (7) can be produced, wherein cup spring (3) is subjected to practically no wear and tear.

For this purpose, all materials are to be used in their elastic form; plastic deformations are undesirable.

In FIG. 4, the cross section through a primary arrangement of cup spring (3) is represented, as the cup spring is installed in the uncharged state in accordance with FIG. 1b.

FIG. 5 shows an additional arrangement of cup spring (3a), where at the outer periphery, radial inwardly directed slits (26) and opposite to radial outwardly located slits (27) are provided, which are offset with respect to the gaps at the inner periphery, where slits (26, 27) are at a certain distance (28) from the respective radial outer or inner surface.

In this way, cup spring (3a) is provided with good elasticity in the direction of the tilt; however in the radial direction, it is very solid and can only be compressed to a minimum. In this way the direct transmission of the radially outward forces to the seat of seal (10) in the same horizontal direction as produced by ring (4) it is achieved, i.e., in the same line.

In this way, a line transmission (transfer) of the forces is produced, which is always in the horizontal direction in accordance with FIG. 1a, and no resolution of forces occurs, as had been found to be a disadvantage in the present state of the technology.

FIGS. 2 and 3 show a modified example of the arrangement, namely a flange connection; wherein FIG. 2 shows the flange connection in the sealed state; and FIG. 3 shows the flange connection in the opened state.

Here, in accordance with FIG. 3, two symmetrically arranged flanges (11, 12) face each other and form between themselves space (29), where at the inner, radial outwardly located face of space (29), sealing surfaces (16) of the seal are arranged.

In space (29), washer (13) made of metal is arranged, and again, cylindrical contact surface (22) is formed between the inner periphery of washer (13) and the outer periphery of cup spring (14), which is constructed in the same manner as described before.

In the same way, at the opposing side, cylindrical contact surface (21) is also provided.

Also in this case annular groove (23) could be provided, as is shown in the arrangement of FIG. 1a and 1b.

Otherwise, the same function as with the initially described example of the arrangement example is given, i.e., by means of an axial movement during the screwing together of two flanges (11, 12) via the screw connection with screw (20); seal surfaces (16) are at first directed toward each other, where in the case of upper seal surface (16) cone (30) is arranged, which, when the sealing surfaces are driven together, glides past washer (13) without damaging the sealing surfaces.

The tilted movement is achieved in that, by screwing together two flanges (11, 12), ring (15) is simultaneously moved downwardly in the direction of arrow (6) and hereby, again, cup spring (14) is tilted in the space between two facing contact surfaces (21, 22), which are aligned, and in this manner, a radially, outwardly directed sealing pressure in the direction of arrow (7) is exerted, which results in the sealing force required for joining washer (13) with sealing surfaces (16).

Ring (15) must maintain a certain distance between two flanges (11, 12) with its cover and bottom surfaces, so that it can move within space (29) with radial play (25).

To FIGS. 1a and 1b, it is added that washer (2) is connected to axially movable ring (4) by means of a catch which is not shown in greater detail.

If, for achieving an opening movement in FIG. 1a, ring (4) is moved in the direction opposite to that of arrow (6) in a downward direction, then this catch element of washer (2) grips under ring (4), so that washer (2) is also lifted from sealing surface (10) in the direction opposite to that of arrow (6), and is taken along in the direction opposite that of arrow (6) in a downward direction.

With the present invention, the resolution of forces is not brought about via the sealing element—as, for example, in German Pat. No. 2,947,585—but via a separate member, namely cup spring (3 or 3a) with floating ring (4). For this reason, this separate member is not sensitive to fine scratches or damages resulting from the movements carried out by such a member in order to effect the sought after resolution of forces in accordance with the invention.

What is claimed is:

1. Seal for flanges, especially in vacuum technology, having at least two facing sealing surfaces, arranged at a flange and at a washer, against which an axially displaceable sealing element in the form of a cup spring is positioned, said seal comprising said washer having an annular bulge which is radially deformable in the elastic state; said cup spring being positioned between an axially displaceable ring of a smaller diameter and said annular bulge of said washer, said cup spring being arranged, so that in the open state of the flange at a certain angle of approximately 12°, enough distance is provided, so that the outer diameter of the cup spring touches the inner diameter of said annular bulge and the inner diameter of the cup spring touches said axially displaceable ring in a generally axial direction, so that when the cup spring is in the locked position, it transfers eh sealing force from the axially displaceable ring to the annular bulge of the washer in a radially outward direction onto a sealing line; said cup spring, while in the closed state, being completely pressed through and located at dead center and thus being positioned for a theoretically infinite transmission of forces, axial to radial.

2. The seal of claim 1, in which the outer surface of the radially deformable bulge of the washer, arranged for seal seat (10), is in the form of seal edge.

3. The seal of claim 1, in which the ring is arranged on its central axis with radial play.

4. The seal of claim 1, in which the cup spring has arranged at its outer periphery, radial inwardly directed slits and at its inner periphery, radial outwardly directed slits.

5. The seal of claim 1 in which the washer engages the axially movable ring via a catch.

6. Seal for valves, especially in vacuum technology, having at least two facing sealing surfaces, arranged at a flange and at a washer, against which an axially displaceable sealing element in the form of a cup spring is positioned, said seal comprising a washer having an annular bulge which is radially deformable in the elastic state; said cup spring being positioned between an axially displaceable ring of a smaller diameter and said annular bulge of said washer, said cup spring being arranged, so that in the open state of the valve at a certain angle of approximately 12°, enough distance is provided, so that the outer diameter of the cup spring touches the inner diameter of annular bulge and the inner diameter of the cup spring touches said axially displaceable ring in a generally axial direction, so that when the cup spring is in the locked position, it transfers the sealing force from the axially displaceable flange to the annular bulge of the washer in a radially outward direction onto a sealing line; said cup spring, while in the closed state, being completely pressed through and located at dead center and thus being positioned for a theoretically infinite transmission of forces, axial to radial.

* * * * *